US011853298B2

(12) United States Patent
Pesala et al.

(10) Patent No.: US 11,853,298 B2
(45) Date of Patent: Dec. 26, 2023

(54) DATA STORAGE AND DATA RETRIEVAL METHODS AND DEVICES (71) Applicant: Huawei Cloud Computing Technologies Co., Ltd., Guizhou (CN)

(72) Inventors: Ravindra Pesala, Karnataka (IN); Raghunandan Subramanya, Bangalore (IN); Venkata Ramana Gollamudi, Karnataka (IN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 34 days.

(21) Appl. No.: 17/713,366

(22) Filed: Apr. 5, 2022

(65) Prior Publication Data

US 2022/0229837 A1    Jul. 21, 2022

Related U.S. Application Data (63) Continuation of application No. PCT/CN2021/075869, filed on Feb. 7, 2021.

(30) Foreign Application Priority Data

Apr. 28, 2020 (IN) .............................. 202041018257

(51) Int. Cl.
*G06F 16/00* (2019.01)
*G06F 16/2453* (2019.01)
(Continued)

(52) U.S. Cl.
CPC ........ *G06F 16/2453* (2019.01); *G06F 16/221* (2019.01); *G06F 16/2329* (2019.01);
(Continued)

(58) Field of Classification Search
CPC ............... G06F 16/221; G06F 16/2329; G06F 16/2453; G06F 16/24564; G06F 16/2471;
(Continued)

(56) References Cited

U.S. PATENT DOCUMENTS 10,904,689 B2 * 1/2021 Yoo ........................ G10L 19/173
10,936,616 B2 * 3/2021 Potapov ............ G06F 16/24542
(Continued)

FOREIGN PATENT DOCUMENTS

| EP | 2608071 A1 | 6/2013 |
| EP | 3252592 A1 | 12/2017 |
| JP | 5660693 B2 | 1/2015 |

OTHER PUBLICATIONS

Juchang Lee et al., "High-Performance Transaction Processing in SAP HANA," Bulletin of the IEEE Computer Society Technical Committee on Data Engineering, 2013, 6 pages.
(Continued)

*Primary Examiner* — Diedra McQuitery
(74) *Attorney, Agent, or Firm* — Conley Rose, P.C.

(57) ABSTRACT

A method includes receiving data in a first format to be written into a data storage, where the first format is a multiversion concurrency control (MVCC) row format. The data is stored in the first format in the data storage and is transitioned from the first format to a second format based on a first transition parameter, where the second format is an MVCC columnar format. Data is stored in the second format in the data storage and is transitioned from the second format to a third format based on a second transition parameter, where the third format is a columnar format. The data storage stores non-overlapping data in the first format, the second format, and the third format.

17 Claims, 7 Drawing Sheets

(51) Int. Cl.
   *G06F 16/23*   (2019.01)
   *G06F 16/25*   (2019.01)
   *G06F 16/27*   (2019.01)
   *G06F 16/28*   (2019.01)
   *G06F 16/22*   (2019.01)
   *G06F 16/2455* (2019.01)

(52) U.S. Cl.
   CPC ...... *G06F 16/24564* (2019.01); *G06F 16/258* (2019.01); *G06F 16/278* (2019.01); *G06F 16/283* (2019.01)

(58) Field of Classification Search
   CPC ...... G06F 16/254; G06F 16/258; G06F 16/27; G06F 16/278; G06F 16/283
   See application file for complete search history.

(56) References Cited

U.S. PATENT DOCUMENTS

| | | |
|---|---|---|
| 2006/0069695 A1 | 3/2006 | Katsumata et al. |
| 2012/0246202 A1 | 9/2012 | Surtani et al. |
| 2013/0073513 A1 | 3/2013 | Kemper et al. |
| 2016/0147834 A1 | 5/2016 | Lee et al. |
| 2016/0253382 A1 | 9/2016 | Shadmon |
| 2017/0097972 A1 | 4/2017 | Zhou et al. |
| 2018/0107725 A1 | 4/2018 | Bi et al. |
| 2019/0278862 A1* | 9/2019 | Kapoor ............... G06F 16/2282 |
| 2021/0034598 A1* | 2/2021 | Arye ................... G06F 16/288 |
| 2021/0279354 A1* | 9/2021 | Gandhi ............... G06F 11/3034 |
| 2022/0294816 A1* | 9/2022 | Martin ................ G06F 16/9038 |

OTHER PUBLICATIONS

"Using Apache Impala with Kudu," https://docs.cloudera.com/documentation/enterprise/latest/topics/kudu_impala.html, May 14-19, 2017, 11 pages.

Fatma Ozcan et al., "Hybrid Transactional/Analytical Processing: A Survey," SIGMOD, May 14-19, 2017, 5 pages.

Joy Arulraj et al., "Bridging the Archipelago between Row-Stores and Column-Stores for Hybrid Workloads," SIGMOD'16, ACM. ISBN 978-1-4503-3531-7/16/06, DOI: http://dx.doi.org/10.1145/2882903, Jun. 26-Jul. 1, 2016, 16 pages.

* cited by examiner

DATA STORAGE AND DATA RETRIEVAL METHODS AND DEVICES

CROSS-REFERENCE TO RELATED APPLICATIONS

This application is a continuation of International Patent Application No. PCT/CN2021/075869 filed on Feb. 7, 2021, which claims priority to Indian Patent Application No. 202041018257 filed on Apr. 28, 2020. The disclosure of the aforementioned application is hereby incorporated by reference in its entirety.

TECHNICAL FIELD

The present subject matter relates, in general, to data storage and data retrieval, and in particular, to data storage and data retrieval in distributed data processing systems.

BACKGROUND

Distributed data systems, such as big data systems, deal with high rates of transactional and analytical queries. The data storage systems may implement different types of database management systems, such as Structured Query Language (SQL) database management system for structured querying and not-only SQL (NoSQL) database management systems for unstructured querying. While structured database management systems are highly reliable systems, unstructured database management systems provide faster responses and are highly scalable. Various frameworks, such as HADOOP or SPARK, may be used to process the large amounts of data in the big data systems.

For ease of data processing, the database management systems may store data in various formats, such as row format or columnar format, depending on how the data is likely to be used. Additionally, concurrency control may be performed to allow multiple users or devices to simultaneously access the database. In some databases, multiversion concurrency control (MVCC) may be used to support atomic transactions so that a read operation does not wait for a write operation and a write operation does not wait for a read operation.

SUMMARY

Aspects of the present subject matter provide devices and methods for data storage and data retrieval to facilitate both high throughput transactions and analytical data processing in a single data storage and retrieval system without duplicating the data stored therein.

According to a first aspect, a method for data storage is provided, the method comprises receiving data to be written into a data storage unit. The data is stored in a first format in the data storage unit and subsequently transitioned from the first format to a second format based on a first transition parameter. The first format is an MVCC row format while the second format is an MVCC columnar format. Further, the method comprises storing data in the second format in the data storage unit and subsequently transitioning data from the second format to a third format based on a second transition parameter. The third format is a columnar format. Accordingly, non-overlapping data is stored in the first format, the second format and the third format in the data storage unit.

According to a second aspect, a method for data retrieval is provided, where the method comprises receiving a plurality of queries from one or more client devices. The plurality of queries is classified into a first type of query or a second type of query, where the first type of query is a transactional query and the second type of query is an analytical query. A first node or a second node is selected to execute the query based on the type of query. The query is then routed to the first node for handling the first type of query or to the second node for handling the second type of query. The first node and the second node retrieve data from a data storage unit that stores non-overlapping data in a first format, a second format and a third format, to execute the query.

According to a third aspect, a device for data storage and data retrieval is provided where a querying module is configured to receive one or more queries from a plurality of client devices and classify the queries based on a type of query into a first type of query or a second type of query. The first type of query is a transactional query and the second type of query is an analytical query. Further, the querying module is configured to select a first node or a second node to execute the query based on the type of query. A query router is configured to route the query to the first node for handling the first type of query or to the second node for handling the second type of query. The first node and the second node are configured to retrieve data from a data storage unit, which stores non-overlapping data in a first format, a second format and a third format, to execute the query.

According to a fourth aspect, a device comprises an ingestion module configured to write data to be stored in a data storage unit in a first format, wherein the first format is an MVCC row format. A transformation module is configured to transition data from the first format to a second format based on a first transition parameter, wherein the second format is an MVCC columnar format. Further the transformation module is configured to store data in the second format in the data storage unit and transition data from the second format to a third format based on a second transition parameter, wherein the third format is a columnar format. Thus, the data storage unit stores non-overlapping data in the first format, the second format and the third format in the data storage unit.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Big data systems deal with high rates of transactional queries as well as analytical queries. Transactional queries are queries such as a look-up query, a point query, or a search query, where a single or small set of records are to be accessed to respond to the query. Analytical queries on the other hand need to process a large amount of data to perform the analysis and respond to the query. Typically, different database management systems are used to handle the different types of queries. For example, database management systems like HBASE can efficiently handle transactional queries, but cannot handle analytical queries efficiently. On the other hand, applications like SPARK or HIVE are used mainly for handling analytical queries, such as during online analytical processing (OLAP), and not for point or search queries.

To allow both types of queries to be executed on the same set of data, big data systems duplicate the data and store it using two database management systems, where one database management system stores data in a format optimized for responding to transactional queries and the other database management system stores data in a format optimized for responding to analytical queries. However, such an approach has various disadvantages.

For example, initially the data may be stored in row format to facilitate fast transaction processing, such as insertion, updating, and deletion of data in the database. For analytical queries to be run efficiently on the data, the data is converted to read optimized formats, like columnar format, and stored in another database such as a data warehouse. The process of reading data from a database, converting the data from one format to the other, and writing the data into the warehouse is known as extraction, transformation, and loading (ETL) process. ETL data is moved from one database to another by a pipelining method. This technique may lead to stale data being stored in the second database as the data may have been updated on the first database but may not be updated simultaneously on the other database and hence may not reflect real-time data. When the stale data is used for responding to analytical queries, it may lead to erroneous analysis. Taking an example of an Internet of things (IoT) system, where tracking in a courier system is performed, the information on the exact location of a delivery at a particular instance of time may be required for further analysis. If the data is not updated on a real time basis, then the basis on which the analysis is conducted will be erroneous.

Further, this technique is highly cost intensive as maintaining two separate database management systems with complex ETL processes incurs a technical and economical penalty. This is because there are two different clusters of data storage and retrieval systems to be maintained, each with their own set of resources that cannot be shared with each other. These clusters having various hardware and software components have to be manually tuned and manually maintained by technical personnel, thereby increasing the cost of maintenance considerably. Also, maintaining multi version data on analytical databases involves additional processing and is time consuming as it is not inherent, but needs to be performed manually.

In another technique, data is stored in columnar format on the hard-disk and row format in memory. However, this technique is limited by the memory capacity. Data stored in the columnar format on the hard disk would require more time to retrieve. As a result, the system slows down the insert or update operations.

The present subject matter addresses these and other problems of conventional techniques as discussed above and provides systems and methods for data storage and data retrieval that can be efficiently utilized for both transactional and analytical querying. The present subject matter provides a hybrid data storage and data retrieval system to maintain a single copy of data and support both high transactional type of queries as well as analytical queries.

The data storage and data retrieval system supports high throughput ingestion in MVCC row format into a data storage unit. MVCC, or multi version concurrency control, helps in ensuring consistency of data when multiple read and write actions are performed simultaneously in a data storage unit. The data that is stored in the MVCC row format is streamed to a first columnar format on a first transition parameter being fulfilled, where additional columns are added to the columnar format to track the version or transaction information. This format which maintains additional columns to track the version or transaction information is called the MVCC columnar format. Based on versioning information, the data can be filtered when scanning or reading the MVCC columnar format. The data stored as MVCC columnar format is transformed to second columnar format, also referred as columnar format, on a second transition parameter being fulfilled. In the columnar format, the various versions of the data that were stored in the MVCC columnar format are combined so that the columnar format provides the latest version of data that is transformed from the MVCC columnar format. Since data is transformed from one format to another instead of being duplicated, the data storage unit stores non-over-lapping data in different formats that are compatible to execute different type of queries.

In one example, various node clusters may be associated with the data storage units for efficient query processing. A node may be a computing device associated with a data storage unit for accessing data from the data storage unit or an application stored in a computing device. There may be a first cluster of nodes to handle transactional queries and a second cluster of nodes to handle analytical queries.

Further, the devices and methods of the present subject matter facilitate optimized querying, where on receiving queries from a client device, the queries are routed to their respective node clusters based on the type of query. The node cluster helps in retrieving data from the data storage unit. Thus, both types of queries, for example, a transactional query and an analytical query, can be handled simultaneously without waiting for the current query to be executed. For example, if the system is executing an analytical query and a high priority transaction query need to be executed, the high priority transactional query can be executed by a dedicated cluster for transactional queries, instead of waiting for the analytical query to be executed completely, thereby providing better concurrency of execution.

The present subject matter thus provides an efficient data storage and retrieval device and method that reduces the data duplication and management overhead significantly and ensures that service-level agreements (SLAs) of high priority tasks can be met with minimal impact on current running analytical jobs.

The present subject matter also provides faster response to queries by effective utilization of existing resources, thereby reducing resource wastage. This method and systems are effective for both unplanned adhoc workloads like query processing and planned workloads like analytical processing.

The above and other features, aspects, and advantages of the subject matter will be better explained with regards to the following description and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

Figure 1:
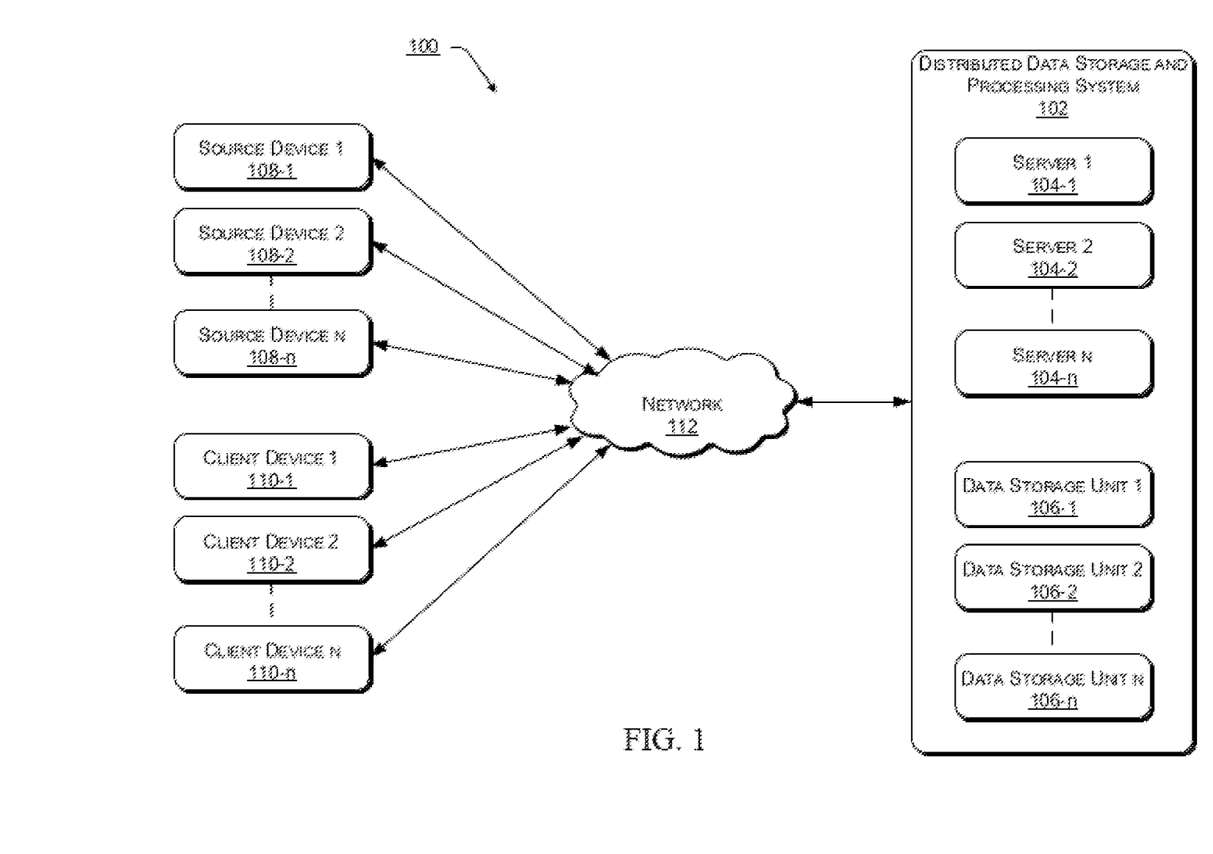
FIG. 1 illustrates a block diagram of a networking environment having a distributed data storage and processing system for implementing data storage and data retrieval in accordance with an example of the present subject matter.

FIG. 1 illustrates a block diagram of a networking environment having a distributed data processing system for implementing data storage and data retrieval in accordance with an example of the present subject matter. The networking environment 100 comprises a distributed data storage and processing system 102 that includes a plurality of servers 104-1, 104-2, . . . 104-n and a plurality of distributed data storage units 106-1, 106-2, . . . 106-n. The distributed data storage and processing system 102 may be referred to as system 102. The plurality of servers 104-1, 104-2, . . . 104-n may be alternatively referred to as servers 104 or server 104 or device 104. Similarly, the plurality of distributed data storage units 106-1, 106-2, . . . 106-n may be alternatively referred to as data storage units 106 or data storage unit 106. In one example, the plurality of servers 104-1, 104-2, . . . 104-n may be interconnected to each other and the data storage units over networks (not shown in the figure) that may be public or private networks or combination thereof and may be a single network of or a combination of multiple sub-networks.

In one example implementation, the servers 104 may be configured to perform operations such as storage, transformation, and retrieval of data stored in the data storage units 106. The transformation of data may include converting the data from a first format to a second format and the like. The servers 104 may comprise master nodes and slave nodes, where the master nodes may instruct the slave nodes to perform the various operations on the data stored in the data storage units 106. In one example, the data storage units 106 may be present in the system 102 and may be communicatively connected to the servers 104. In another example, the data storage units 106 may be externally accessible to the system 102 for data storage and retrieval.

Further, the system 102 may be communicatively connected to a plurality of source devices 108-1, 108-2, . . . 108-n, alternatively referred as source devices 108 or source device 108, and a plurality of client devices 110-1, 110-2, . . . 110-n, alternatively referred as client devices 110 or client device 110, over a network 112. The network 112 may be a wireless network or a combination of a wired and wireless network. The network 112 can also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Services (PCS) network, Time-division multiple access (TDMA) network, code-division multiple access (CDMA) network, Next Generation Network (NGN), public switched telephone network (PSTN), Long-Term Evolution (LTE), and Integrated Services Digital Network (ISDN).

The source devices 108 may provide the data to be stored in the data storage units 106 to the networking environment 100 over the network 112. In one example, a source device 108 may be an TOT device, a computing device, a personal computer, a laptop, a tablet, a mobile phone, and the like. The source device 108 may provide data as an input to the server 104 and the server 104 may store this data in the data storage units 106. For example, the source device 108 may be a Global Positioning System (GPS) tracker in an automobile, an TOT device associated with an electronic device in a home, a biometric device that collects data, a device through which a user may input data, such as employee data or sales data of an organization and the like. The data provided by the source device 108 may be updated or inserted, into the existing data by the server 104 or deleted from the existing data in the data storage unit 106 by the server 104.

The data stored in the data storage unit 106 may be accessed by the plurality of client devices 110 through the servers 104 over the network 112. In one example implementation, the client device 110 may be a personal computer, a laptop, a tablet, a mobile phone, a desktop computer, an application server, and the like. The client device 110 may request the retrieval of data from the data storage unit 106 by sending a request message. This request message may be sent to the server 104 from the client device 110. The server 104 retrieves data from the data storage unit 106 and shares the data with the client device 110. In one example of distributed data processing systems, data storage and data retrieval can be performed via the server 104 over the network 112.

In operation, the data sent by the source device 108 may be stored in a data storage unit 106 by a server 104. The data that is written into the data storage unit is in the MVCC row format. The data that is stored in the MVCC row format is streamed and stored in the MVCC columnar format and then columnar format based on a transition parameter being fulfilled. Streaming of data comprises transforming data from an initial format to a modified format, storing the data in the modified format and deleting the corresponding data from the initial format. The data storage unit thus stores non-overlapping data in three formats which may be retrieved during query execution.

When there is a query to be executed, the client device 110 may send the query to the server 104 which determines a cluster comprising nodes specific to the query for execution to retrieve data from the data storage unit 106. The nodes of the cluster may be a first set of nodes corresponding to transactional queries or a second set of nodes corresponding to analytical query. The data may be retrieved by the server 104 from the data storage unit 106 through the nodes. The system 102 can send the retrieved data to the client device 110. Various aspects of the data storage and retrieval performed by the server 104 in conjunction with the data storage unit 106 are further descried below.

Figure 2:
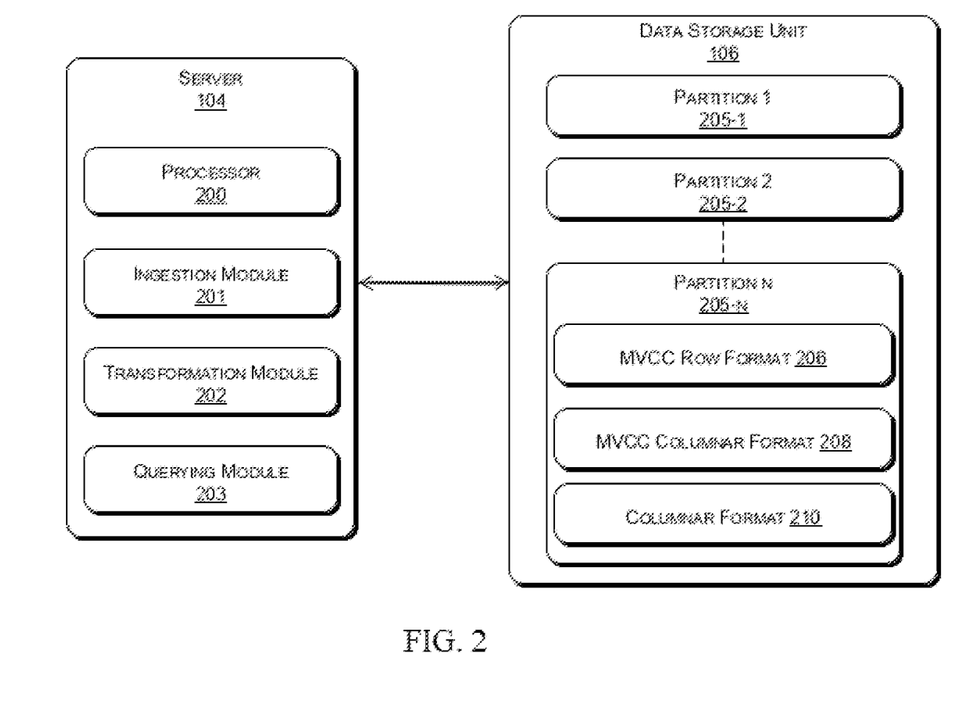
FIG. 2 illustrates a block diagram of a server communicating with a data storage unit in a distributed data storage and processing system, in accordance with an example of the present subject matter.

FIG. 2 illustrates a block diagram of a server communicating with a data storage unit in a distributed data processing system, in accordance with an example of the present subject matter. In one example, the server 104 may comprise a processor(s) 200, an ingestion module 201, a transformation module 202 and a querying module 203. The processor(s) 200 may be implemented as microprocessors, microcomputers, microcontrollers, digital signal processors, central processing units, state machines, logic circuitries, and/or any devices that manipulate signals based on operational instructions. Among other capabilities, the processor(s) 200 may fetch and execute computer-readable instructions stored in a memory. The functions of the various elements shown in the figure, including any functional blocks labeled as "processor(s)", may be provided through the use of dedicated hardware as well as hardware capable of executing machine readable instructions. The processor(s) 200 may be configured to execute functions of various modules of the sever 104 such as the ingestion module 201, the transformation module 202 and the querying module 203.

The ingestion module 201 may receive input data to be stored in the data storage unit 106 from the source device 108. In one example implementation, the ingestion module 201 may be a part of the server 104. In another example implementation, the ingestion module 201 may be on a computing device that may be connected remotely to the distributed data storage and processing system 102. In one example, the ingestion module 201 may receive data in various formats, such as key-value data, streaming ingestion data, or change data capture (CDC) data for storage in the data storage unit 106.

The ingestion module 201 stores data in the first format and the transformation module 202 may be configured to transition the non-overlapping data stored in the data storage unit 106 from one format to another format. In one example, the first format may be MVCC row format 206, the second format may be MVCC columnar format 208, and the third format may be columnar format 210. In one example implementation, the transformation module 202 may be remotely accessed by the server 104. In another example implementation, the transformation module 202 may be an integral part of the server 104. The transformation module 202 may be configured to transition data stored in the first format to the second format and subsequently to the third format based on various transition parameters.

Thus, the data storage unit 106 stores non-overlapping data in three formats. In one example, the disk or memory of the data storage unit 106 may be partitioned into a number of partitions 205-1, 205-2, . . . 205-n alternatively referred to as partitions 205 or partition 205, where each partition 205 stores data. The transformation of data from one format to the other format happens in each of the partitions 205 based on transition parameters. Thus, each partition 205 may store data in the first format, the second format, and the third format. In one example, the data storage unit 106 receives data in the first format to be written into the data storage unit 106 from the ingestion module 201. The transformation module 202 then transitions the data ingested into various formats.

For data retrieval, the querying module 203 may retrieve data from the various partitions 205 and one or more of the first format, second, format, and third format, based on a received query. For example, the querying module 203 may receive a plurality of queries from the client devices 110 to retrieve data from the data storage unit 106. The querying module 203 may receive transactional queries, analytical queries or a combination of both. Based on the type of the query, the querying module may retrieve data using query specific clusters of the data storage unit 106, as will be further explained below.

Figure 3:
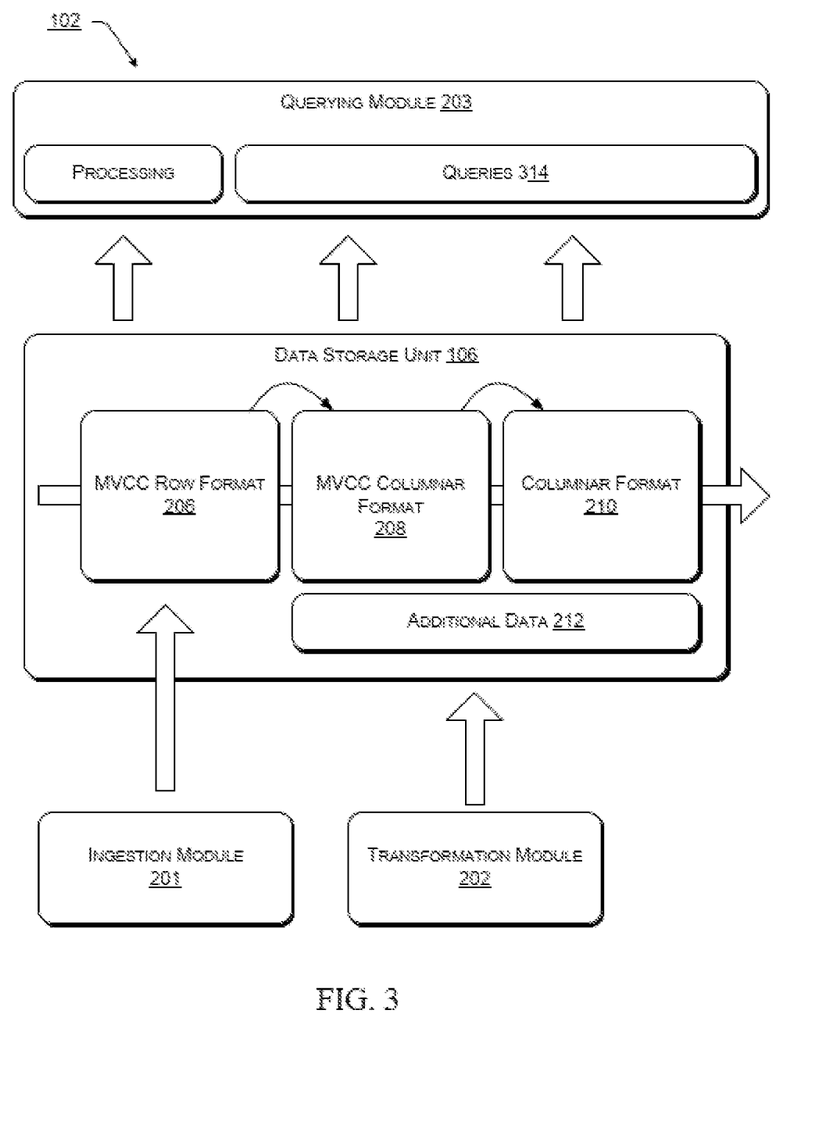
FIG. 3 illustrates a schematic representation of data storage and retrieval, in accordance with an example of the present subject matter.

FIG. 3 illustrates a schematic representation of data storage and retrieval, in accordance with an example of the present subject matter. Data in the first format is ingested into the data storage unit 106 by the ingestion module 201. For example, the first format is a MVCC row format 206. The MVCC row format is commonly used by systems which maintain their data in row format like HBASE or Avro base systems and add additional columns to identify the version or transaction of each row.

The present subject matter uses the MVCC row format to store multiple versions of data at the time of ingestion, where a version of data corresponds to an instance when the data was stored or updated. In one example, data stored in the MVCC row format 206 supports the retrieval of data from any version. The data stored in the MVCC row format 206 in the data storage unit 106 is thus optimized for high throughput transactions and faster key-based lookups or queries.

Based on a first transition parameter, the data stored in the first format is transitioned into a second format. For example, the second format is an MVCC columnar format 208. The transformation module 202 may be configured to transition the data stored in the MVCC row format 206 to the MVCC columnar format 208 based on the transition parameter. In one example, additional columns may be added in the columnar format to identify the version or transaction of each row which is termed as MVCC columnar format 208.

In one example, the first transition parameter may be a duration of time for which, the data is to be stored in the first format in the data storage unit 106. Data in the first format may be transformed to the second format after the duration of time for which the data may be stored in the first format. In one example, transition of data may be modelled such that if the duration of time for storage of data in the first format is set to one hour for example, then, on completion of one hour, the earliest data that was ingested in the MVCC row format and has been stored in the same format for one hour may be streamed into the second format MVCC columnar format 208. The data is then stored in the MVCC columnar format 208.

In another example, the first transition parameter may be based on a size of data stored in the first format. In one example, transition of data may be modelled such that if the size of the data stored in the first format exceeds 1 gigabyte (GB) for example, then once the data stored in the first format MVCC row format 206 exceeds 1 GB, the data may be streamed into the second format MVCC columnar format 208. The data is then stored in the MVCC columnar format 208. MVCC columnar format 208 may also maintain multiple versions data similar to the MVCC row format 206 but stored in a columnar format. Any version of data may be retrieved from the MVCC columnar format 208.

In one example, the transformation module 202 of the server 104 may be configured to transition data from the second format to the third format. For example, based on a second transition parameter, the data stored in the second format is transitioned into a third format, where the third format is a columnar format 210. The data stored in columnar format 210 may be highly compressed and also may be used for scalable OLAP queries. Further the MVCC columnar format 208 and the columnar format 210 may utilize the additional data 212 stored in the data storage unit 106, processed at backend such as aggregated tables, indexing, formatting statistics, metadata and the like which may be used by these formats while executing an analytical query.

Similar to the first transition parameter, in one example, the second transition parameter may be a duration of time for which the data is to be stored in the second format, i.e., the data stored in the data storage unit 106 may be streamed from the second format to the third format based the duration of time for which the data may be stored in the second format. In one example, transition of data may be modelled such that if the duration of time for storage in the second format is set to one hour for example, then on completion of one hour, the earliest data that was ingested in the MVCC columnar format 208 and has been stored in the same format for one hour may be streamed into the third format columnar format 210. The data is then stored in the columnar format 210.

In another example, the second transition parameter may be based on a size of data stored in the second format. In one example, transition of data may be modelled such that if the size of the data stored in the second format exceeds 1 GB for example, then once the data stored in the second format MVCC columnar format 208 exceeds 1 GB, the data may be streamed into the third format columnar format 210. The data is then stored in the columnar format 210.

Thus, the data storage unit 106 stores all the three formats of data simultaneously without overlap of data, thereby overcoming the problem of duplication of data. The querying module 203 of the server 104 may retrieve data from one or more of the first, second, and third format for responding to queries as explained in detail with reference to FIG. 4.

Figure 4:
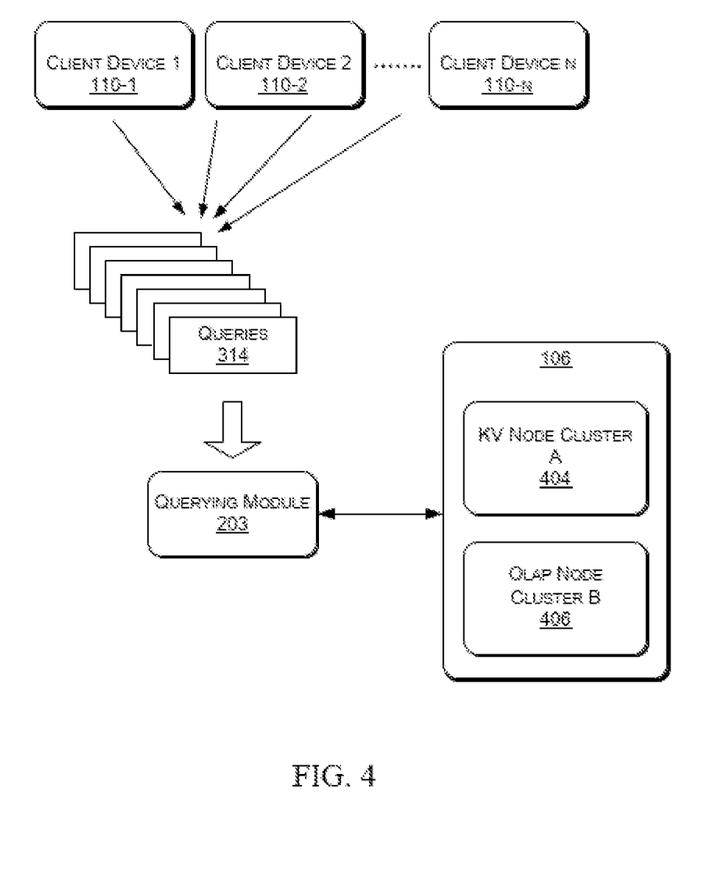
FIG. 4 illustrates a schematic representation of concurrent data retrieval, in accordance with an example of the present subject matter.

FIG. 4 illustrates a schematic representation of concurrent data retrieval, in accordance with an example of the present subject matter. The distributed data processing system may comprise a plurality of client devices 110, the querying module 203 of the server 104, and the data storage unit 106. The client devices 110 may send a set of queries 314 to the server 104. The querying module 203 may receive the set of queries 314 sent by the client devices 110 and may retrieve data accordingly from the data storage unit 106. The querying module 203 may communicate with the data storage unit 106 over a network (not shown in the figure).

The querying module 203 may be configured to classify the queries 314 that are received from a plurality of client devices 110. In one example, the queries 314 may be classified based on a type of query. In another example, the querying module 203 may classify the queries 314 based on the time taken to execute the query. The querying module 203 may be configured to classify the queries 314, based on their type into transactional queries or analytical queries. Transactional queries may comprise point queries, key based queries, searches, and the like. Analytical queries may require analysis of data retrieved from the data storage unit and may use aggregated tables, statistical data, multiple columns, slice and dice of multiple columns, and the like.

Based on the type of query the querying module 203 may select either cluster A 402 or cluster B 404 to retrieve data for the query. In one example, the cluster A 402 and the cluster B 404 may be a part of the data storage unit 106. The cluster A 402 may be configured to handle transactional queries and the cluster B 404 may be configured to handle analytical queries. Both cluster A 402 and cluster B 404 may retrieve data from the data storage unit 106 to execute the queries 314. In one example, cluster A 402 alternatively referred to as KV node cluster 402 may comprise a set of KV nodes (not shown in the figure) to perform transactional type of queries and similarly, cluster B 404 alternatively referred to as OLAP node cluster may comprise a set of OLAP nodes specific to perform analytical type of queries, explained in detail with reference to FIG. 5. The data retrieved specific to the type of query, is shared with the client device 110 by the server 104 over the network 112.

Figure 5:
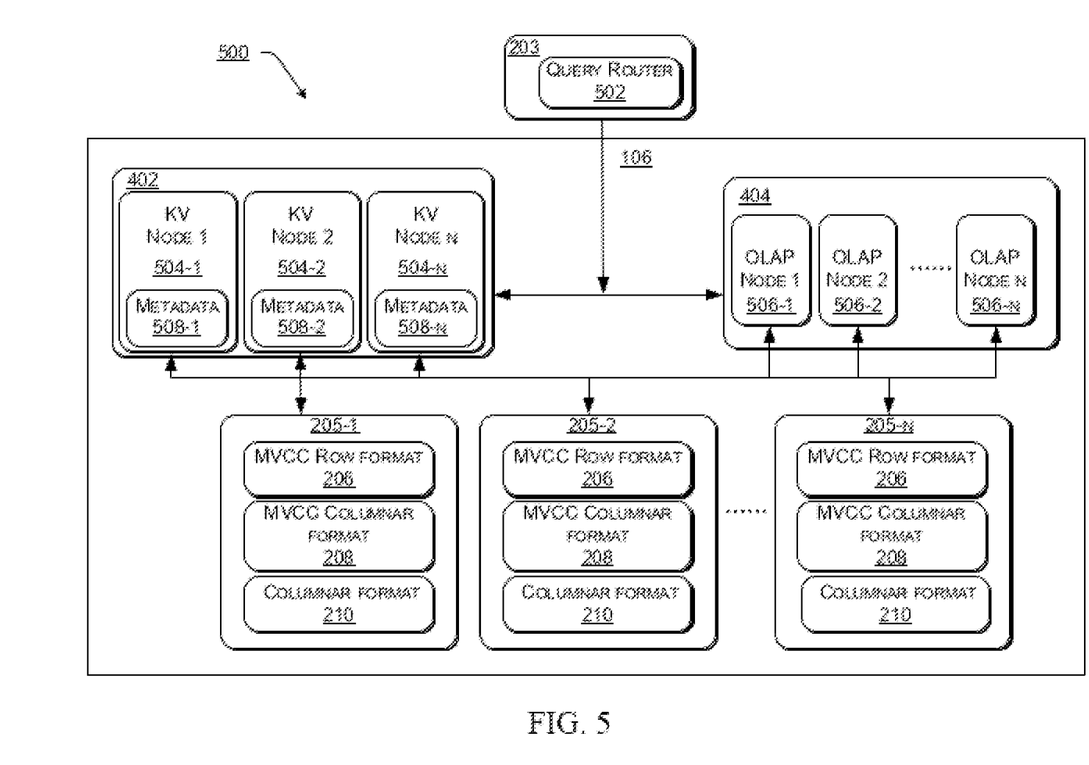
FIG. 5 illustrates a schematic representation of data retrieval for different types of queries, in accordance with an example of the present subject matter.

FIG. 5 illustrates a schematic representation of data retrieval for different types of queries, in accordance with an example of the present subject matter. The example architecture 500 of query optimization shown in the figure may be used to implement execution of both transactional queries as well as analytical queries that retrieve data from the common data storage unit 106. The example architecture 500 can process two types of queries simultaneously. That is both transactional queries and analytical queries can be executed without duplication of data. In one example, when a set of queries 314 is sent by a plurality of client devices 110 to the servers 104, the querying module 203 in the servers 104 classifies the set of queries 314 into transactional queries and analytical queries. The querying module 203 may comprise a query router 502. In one example, the query router 502 may be configured to route a query 314 to a first node for handling a first type of query, where the first type of query is a transactional query. In another example, the query router 502 may be configured to route a query 314 to a second node for handling a second type of query, where the second type of query is an analytical query.

The first node may belong to the cluster A 402 of the data storage unit 106 and the second node may belong to the cluster B 404 of the data storage unit 106. In one example, the first node of cluster A 402 may be a key-value node 504, or a plurality of key value nodes 504-1, 504-2, . . . 504-$n$, alternatively referred to as a KV-node 504. The key-value nodes 504 may be configured to handle transactional queries like key-value look ups for example. Owing to their high transactional speeds to handle transactional queries, KV-nodes 504 may comprise metadata modules 508 as KV-nodes 504 use cache memory to increase the key-value look up speed. The metadata modules 508-1, 508-2, . . . 508-$n$, may make the scalability of KV-nodes rigid when compared to the scalability of the second node.

The second node of cluster B 404 may be an OLAP node 506. OLAP nodes 506 or a plurality of OLAP nodes 506-1, 506-2, . . . 506-$n$ may be configured to handle analytical queries. As can be observed from the figure, OLAP nodes 506 are highly scalable. The scalability of the OLAP nodes 506 makes the system agile. The cluster B 404, may be more elastic as it does not require metadata blocks to be stored in the OLAP nodes 506 to handle analytical queries. The scaling of these OLAP nodes 506 may be based on the type of analytical query to be executed. OLAP nodes 506 are stateless due to which they can dynamically scale out or scale in based on the query load.

In one example implementation, data ingestion by the ingestion module 201 is directly written in MVCC row format in the KV nodes 504.

When the server 104 receives a set of queries 314 from a plurality of client devices 110, the querying module 203 classifies the queries 314 based on the type of query and determines if the query 314 may be routed to KV-nodes 504 or OLAP nodes 506. As discussed above, the point queries or search queries may be sent to KV nodes 504 and other analytical queries like group by, join, union etc. may be sent to the OLAP nodes 506. Both KV nodes 504 and OLAP nodes 506 may be configured to read non-overlapping data from all the three formats of data stored in the data storage unit 106. That is, both KV nodes 504 and OLAP nodes 506 may be configured to read from the MVCC row format 206, MVCC columnar format 208 and columnar format 210. As both KV-nodes 504 and OLAP nodes 506 read or retrieve data from a common data storage unit 106 with non-overlapping data in row format and columnar format, that are frequently updated, both KV-nodes 504 and OLAP nodes 506 can access real-time data for their queries.

In one example implementation, the storing of non-overlapping data in the first format, the second format and the third format in the data storage unit 106 may comprise storing data into one of a plurality of partitions 205 based on a partition parameter. In one example implementation, the disk or memory may be partitioned into a number of partitions 205, where each partition 205 stores data, and subsequently the transformation from one format of data to the other format happens in each of the partitions 205. Each partition 205 stores data in the first format, the second format and the third format. In one example, the partition parameter may be a key value. As it can be observed from the figure, the data storage unit 106 has been partitioned into three partitions 205-1, 205-2 and 205-n. The partitioning of data provides a faster access for data retrieval by the KV-nodes 504 and the OLAP nodes 506. For example, a hashing mechanism is implemented for distributing the data. If there are 1000 partitions in the data storage, then based on a key, data from the first partition, the second partition or the third partition can is retrieved based on which partition the data is stored and all the records in that partition are read logically to retrieve the required data.

In one example, the first node and the second node may comprise readers (not shown in the figure). Readers may be configured to retrieve data of a particular format from the data storage unit 106. Readers may be implemented as a software logic. Each of the first format, the second format and the third format may comprise readers specific to read the first format, the second format and the third format respectively. Based on statistics such as format statistics like amount of data stored, number of rows, number of columns etc., indexing, aggregating and the like, each format will have a logic, so as to enable the reader on reading data from that format and retrieve data specific to the query. Once data corresponding to the query may be read by the reader, the data retrieved may be given to the KV-node 504 or the OLAP node 506 based on which node retrieved the data. The KV-node 504 and the OLAP node 506 may then provide the data retrieved to the querying module 203, which shares the data with the client device 110.

Figure 6:
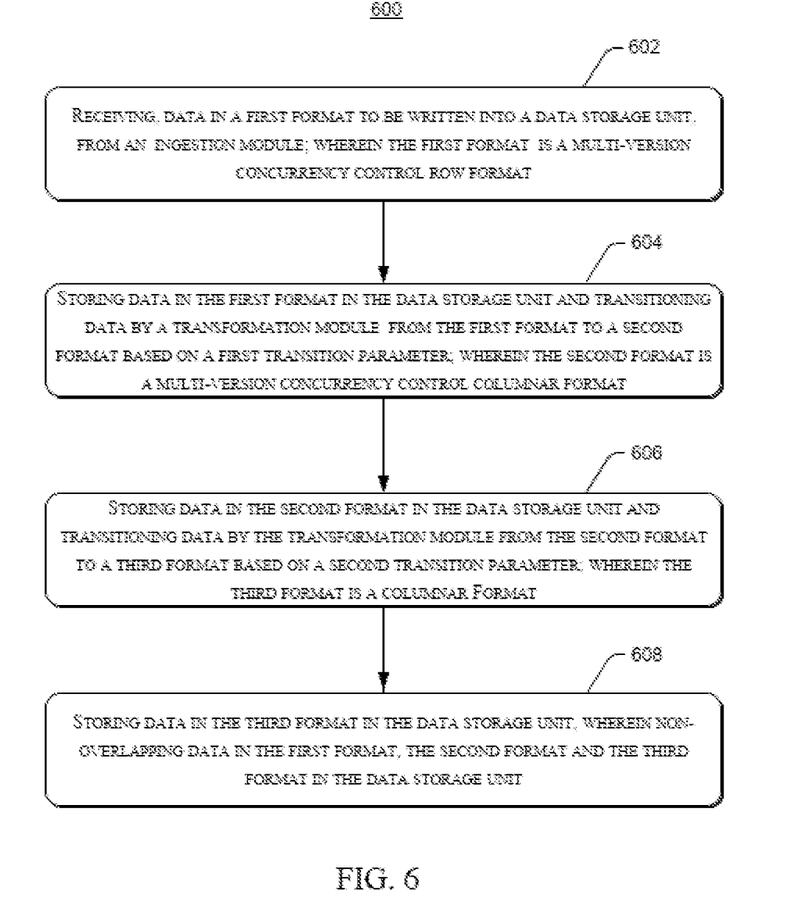
FIG. 6 illustrates a method for data storage, in accordance with an example of the present subject matter.

FIG. 6 illustrates a method for data storage, in accordance with an example of the present subject matter. The order in which the method 600 and 700 are described is not intended to be construed as a limitation, and any number of the described method blocks can be combined in any order to implement method 600 and 700 or an alternative method. Additionally, individual blocks may be deleted from the method 600 and 700 without departing from the spirit and scope of the subject matter described herein. Furthermore, the method 600 and 700 may be implemented in any suitable hardware, computer readable instructions, firmware, or combination thereof. For discussion, the method 600 and 700 are described with reference to the implementations illustrated in FIGS. 1-5.

Figure 7:
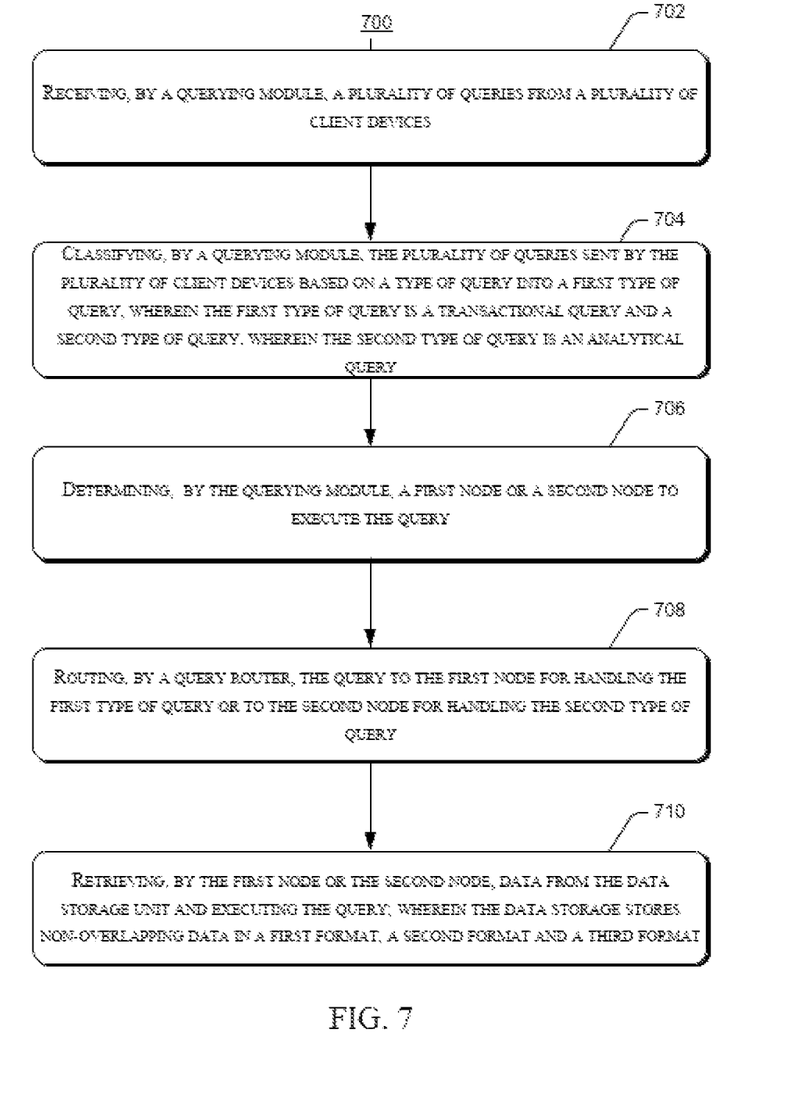
FIG. 7 illustrates a data retrieval method, in accordance with an example of the present subject matter.

A person skilled in the art will readily recognize that steps of the method 600 and 700 can be performed by programmed computers. Herein, some examples are also intended to cover program storage devices and non-transitory computer readable medium, for example, digital data storage media, which are computer readable and encode computer-executable instructions, where said instructions perform some or all of the steps of the described method 600 and 700. The program storage devices may be, for example, digital memories, magnetic storage media, such as magnetic disks and magnetic tapes, hard drives, or optically readable digital data storage media.

FIG. 6 illustrates a method for data storage, in accordance with an example of the present subject matter. At block 602, the method 600 comprises receiving data in a first format to be written into a data storage unit from an ingestion module, wherein the first format is a MVCC row format. In one example implementation, the data storage unit may be the data storage unit 106 and the ingestion module may the ingestion module 201. The ingestion module 201 may receive data in the first format and write the data into the data storage unit 106 in the first format MVCC row format 206.

At block 604, the method 600 comprises storing data in the first format in the data storage unit and transitioning data by a transformation module from the first format to a second format based on a first transition parameter, wherein the second format is a MVCC row format. In one example implementation, the data stored in the first format and transitioning of data from the first format to the second format may be performed in the data storage unit 106 by a transformation module 202 of the server 104. As discussed with reference to FIG. 3, the first transition parameter may be based on in one example, a duration of time for which the data may be stored in the first format and in another example, the first transition parameter may be based on the size of data that may be stored in the first format.

At block 606, the method 600 comprises storing data in the second format in the data storage unit and transitioning data by the transformation module from the second format to a third format based on a second transition parameter, wherein the third format is a columnar format. In one example implementation, the data stored in the second format and transitioning of data from the second format to the third format may be performed in the data storage unit 106 by a transformation module 202 of the server 104. As discussed with reference to FIG. 3, the second transition parameter may be based on in one example, a duration of time for which the data may be stored in the second format and in another example, the second transition parameter may be based on the size of data that may be stored in the second format.

At block 608, the method 600 comprises storing data in the third format in the data storage unit, wherein non-overlapping data is stored in the first format, the second format and the third format in the data storage unit. In one example implementation, the non-overlapping data in the first format, the second format and the third format may be stored in the data storage unit 106. In one example, the non-overlapping data in the first format, the second format and the third format in the data storage unit may comprise storing data into one of a plurality of partitions 205 based on a partition parameter. In one example implementation, the disk or memory may be partitioned into a number of partitions 205, where each partition 205 stores data, and subsequently the transformation from one format of data to the other format happens in each of the partitions 205. Each partition 205 stores data in the first format, the second format and the third format. In one example, the partition parameter may be a key value. When a query is received by the server 104, the server 104 may access data from the data storage unit 106. The query may be a transactional query which may require data to be stored in the row format or an analytical query which may require the data to be stored in columnar format for a faster response time. As, non-overlapping data is stored in all the three formats in a common data storage unit 106, the system can handle both transactional queries as well as analytical queries where data moves across stages and changing from write optimized to read optimized formats without losing MVCC and partitioning.

FIG. 7 illustrates a data retrieval method, in accordance with an example of the present subject matter. The method 700 describes the process of data retrieval on receiving a query form a client device. At block 702, the method comprises receiving, by a querying module, a plurality of queries from a plurality of client devices. In one example implementation, the querying module may be querying module 203, plurality of queries may be plurality of queries 314 and the plurality of client devices may be the client devices 110. In one example, the client device 110 may send a query to the server 104, where the server 104 may comprise the querying module 203. The querying module 203 of the server 104, based on the type of query may retrieve data from clusters A and B of data storage unit 106. The clusters A and B comprise nodes to handle queries. In one example implementation, cluster A may be cluster A 402 and cluster B may be cluster B 404 of the data storage unit 106.

At block 704, the method comprises classifying, by a querying module, the plurality of queries sent by the plurality of client devices based on a type of query into a first type of query, wherein the first type of query is a transactional query and a second type of query, wherein the second type of query is an analytical query. In one example implementation, the querying module 203 may be the querying module 203 of the server 104. The querying module 203 may classify the queries based on, in one example, the type of query or in another example, based on the execution time of a query. The queries may be classified by the querying module 203 into a first type of queries i.e., transactional queries such as look-up, point or search queries or a second type of query i.e., analytical queries such as SQL queries, group by, slice and dice, join, union etc.

At block 706, the method comprises determining, by the querying module, a first node or a second node to execute the query. Based on the type of queries i.e., whether transactional or analytical the queries are sent to cluster A 402 or cluster B 404 respectively, where cluster A 402 may have nodes to handle transactional queries and cluster B 404 may comprise nodes to handle analytical queries.

At block 708, the method comprises routing, by a query router, the query to the first node for handling the first type of query or the second node for handling the second type of query. In one example implementation the query router may be query router 502 which may be a part of the querying module 203. The first node that may be configured to handle a first type of query, a transactional query, may be a key-value node 504 alternatively referred to as a KV node 504 and the second node that may be configured to handle a second type of query, an analytical query may be an OLAP node 506.

At block 710, the method comprises retrieving, by the first node and the second node, data from a data storage unit and executing the query, wherein the data storage unit stores non-overlapping data in a first format, a second format and a third format. In one example implementation, the first node may be a KV node 504, the second node may be the OLAP node 506 and the data storage unit may be the data storage unit 106. As the KV node 504 and the OLAP node 506 can access data from the common data storage unit 106, the data storage and data retrieval system can be a hybrid system that can handle both high throughput transactions and OLAP in a single system without duplicating the data.

The method 600 and 700 can be explained with the following, where in a first example, the geographical position, latitude and longitude of every car in a city A is considered. All the information regarding the latitude and longitude of every car is updated in the distributed data storage and data processing system, depicting the location of the car at every instant.

The data regarding the location of every car is constantly updated in the first format which is the MVCC row format and stored in the data storage unit of the distributed data storage and data processing system. Now, the first transition parameter may be set to one day where, on completion of a day earliest data that was ingested in the MVCC row format and has been stored in the MVCC row format for one day will be transformed into a second format i.e., MVCC columnar format and stored in the data storage unit. On receiving a query from a client device, where the query is regarding the route travelled by a car xyz in the last one hour by a server, the query is sent to the querying module of the server.

The querying module classifies the query to be a transactional query as it contains a key. In this example, the car number is considered as a key. The querying module thus classifies the query to be a point query and routes the query via a query router to the cluster A which comprises KV nodes.

The KV nodes may contain metadata which comprises information. In one example the metadata module may contain the location details of key values from a to z etc. Based on the key values the data may be partitioned in the data storage unit. For example, key values starting from 'a' may be in a first partition, key values starting from 'x' may be in a second partition and the like. So, the KV-node will look up in the partition from where key-value for 'x' is stored to obtain the car number xyz and details relating to it. Further data from all the formats will be gathered, for example there may be two records in the row format and 10 records in the columnar format, the KV node gathers all these records and shares it with the querying module of the server, which in turn shares the details corresponding to the query to the client device.

Considering the same example as stated above, a client device may send a second query regarding all the cars around a particular area in city A. As there is no key value associated with this query, the querying module of the server on receiving this query, sends the query to cluster B which comprises thee OLAP nodes. Systems like HBASE cannot handle such type of queries as these queries do not contain keys. The OLAP nodes may obtain data from the MVCC columnar format where aggregated data of latitudes and longitudes of different cars are already stored, or from indexing mechanism where the latitudes and longitudes are indexed and stored which can be accessed. The data stored in the MVCC columnar format may be transformed into columnar format based on the second transition parameter, where the second transition parameter may be set to a duration of 10 days. So, the earliest data that was ingested in the MVCC columnar format and has been stored in the MVCC columnar format for a period of 10 days, will be transformed into the columnar format. The columnar format data can be optimized to contain the latest updated data, where the latest updated data may be the latest data that is transformed from the MVCC columnar format. Based on the type of query the OLAP node can access data from any one the formats and share it with the querying module which is in turn shared with the client device.

The present subject matter thus provides a hybrid system that can handle both high throughput transactions and OLAP in a single system without duplicating the data. It allows the execution of both transactional queries and analytical queries on the single data store where data moves across stages and changing from write optimized to read optimized formats without losing MVCC and partitioning. The querying module will decide whether the queries received should go to KV nodes or OLAP nodes based on the query plan. Usually, the transactional queries such as point, or search queries are sent to KV nodes and other queries, analytical queries like group by, join, union etc. are sent to OLAP nodes. As, KV nodes and OLAP nodes both are able to read both row format and columnar data, both KV queries and OLAP queries can access real time data.

Although implementations for systems and methods for data storage and data retrieval have been described in language specific to structural features and/or methods, it is to be understood that the present subject matter is not necessarily limited to the specific features or methods described. Rather, the specific features and methods are disclosed and explained in the context of a few example implementations.

What is claimed is:

1. A method comprising:
   storing, in a data storage, input data in a first format to obtain first data, wherein the first format is a multiversion concurrency control (MVCC) row format;
   transitioning the first data from the first format to a second format based on a first transition parameter to obtain second data, wherein the second format is an MVCC columnar format;
   storing, in the data storage, the second data;
   transitioning the second data from the second format to a third format based on a second transition parameter to obtain third data, wherein the third format is a columnar format; and
   storing, in the data storage, non-overlapping data in the first format, the second format, and the third format.

2. The method of claim 1, further comprising storing the input data into one of a plurality of partitions based on a partition parameter, wherein each of the partitions is configured to store data in the first format, the second format, and the third format.

3. The method of claim 1, wherein the first transition parameter comprises a duration of time for which the first data is to be stored in the first format in the data storage.

4. The method of claim 1, wherein the first transition parameter comprises a size of fourth data to be stored in the first format.

5. The method of claim 1, wherein the second transition parameter comprises a duration of time for which the second data is to be stored in the second format in the data storage.

6. The method of claim 1, wherein the second transition parameter comprises a size of fourth data to be stored in the second format.

7. The method of claim 1, wherein the input data comprises key-value data.

8. The method of claim 1, wherein the input data comprises streaming ingestion data.

9. The method of claim 1, wherein the input data comprises change data capture data.

10. The method of claim 1, further comprising storing, in an additional column, version data from the first format when transitioning the first data from the first format to the second format.

11. The method of claim 1, further comprising combining multiple versions of data present in the second format to obtain a latest version of the data for storing in the third format when transitioning the data from the second format to the third format.

12. A device comprising:
    a memory configured to store instructions; and
    a processor coupled to the memory, wherein the processor is configured to execute the instructions to:
    store, in a data storage, input data in a first format to obtain first data, wherein the first format is a multiversion concurrency control (MVCC) row format;
    transition the first data from the first format to a second format based on a first transition parameter to obtain second data, wherein the second format is an MVCC columnar format;
    store, in the data storage, the second data;
    transition the second data from the second format to a third format based on a second transition parameter to obtain third data, wherein the third format is a columnar format; and
    store non-overlapping data in the first format, the second format, and the third format in the data storage.

13. The device of claim 12, wherein the first transition parameter comprises either a duration of time for which the first data is to be stored in the first format in the data storage or a size of the first data to be stored in the first format.

14. The device of claim 12, wherein the second transition parameter comprises either a duration of time for which the second data is to be stored in the second format in the data storage or a size of the second data to be stored in the second format.

15. The device of claim 12, wherein the input data comprises one or more of key-value data, streaming ingestion data, or change data capture data.

16. The device of claim 12, wherein the processor further executes the instructions to store, in an additional column, version data from the first format when transitioning the first data from the first format to the second format.

17. The device of claim 12, wherein the processor further executes the instructions to combine a plurality of versions of data present in the second format to obtain a latest version of the data for storing in the third format when transitioning the data from the second format to the third format.

* * * * *